United States Patent [19]

Boxall

[11] Patent Number: 4,804,956
[45] Date of Patent: Feb. 14, 1989

[54] REARRANGEABLE DIGITAL SIGNAL SPACE DIVISION SWITCHING SYSTEM

[75] Inventor: Frank S. Boxall, Woodside, Calif.

[73] Assignee: General Signal Corporation, Stamford, Conn.

[21] Appl. No.: 846,910

[22] Filed: Mar. 31, 1986

[51] Int. Cl.[4] .................. H04Q 9/00; H04Q 11/04
[52] U.S. Cl. .................. 345/825.790; 370/63; 340/825.800
[58] Field of Search .................. 379/221; 340/825.79, 340/825.8; 370/58, 63, 64, 54

[56] References Cited

U.S. PATENT DOCUMENTS

| | | | |
|---|---|---|---|
| 3,129,407 | 4/1964 | Paull | 340/825.03 |
| 4,005,272 | 1/1977 | Collins et al. | 370/54 |
| 4,022,982 | 5/1977 | Hemdal | 370/54 |
| 4,038,497 | 7/1977 | Collins et al. | 370/54 |
| 4,038,638 | 7/1977 | Hwang | 340/826 |
| 4,075,608 | 2/1978 | Koenig | 340/825.8 |
| 4,229,624 | 10/1980 | Haben et al. | 340/826 |
| 4,300,230 | 11/1981 | Philip et al. | 370/63 |
| 4,317,193 | 2/1982 | Joel, Jr. | 370/54 |
| 4,345,116 | 8/1982 | Ash et al. | 379/221 |
| 4,417,244 | 11/1983 | Melas | 340/825.8 |
| 4,417,245 | 11/1983 | Melas et al. | 340/825.8 |
| 4,495,615 | 1/1985 | Wilcke | 370/54 |
| 4,566,007 | 1/1986 | Richards | 340/825.8 |
| 4,654,842 | 3/1987 | Coraluppi et al. | 340/825.8 |
| 4,667,320 | 5/1987 | Onno | 340/825.79 |

OTHER PUBLICATIONS

"A Study of Non-Blocking Switching Networks", by Charles Clos, *Bell System Technical Journal*, Mar. 1953.

Primary Examiner—Donald J. Yusko
Attorney, Agent, or Firm—Flehr, Hohbach, Test, Albritton & Herbert

[57] ABSTRACT

A digital signal space division switching system in which signal blocking to new connections is avoided by rearranging existing connections. The rearrangement is accomplished without disturbing existing traffic and without requiring alternate paths to temporarily support existing traffic on rearranged signal paths. Multiple rearrangements are executed simultaneously.

22 Claims, 5 Drawing Sheets

FIG. 8

REARRANGEABLE DIGITAL SIGNAL SPACE DIVISION SWITCHING SYSTEM

BACKGROUND OF THE INVENTION

This invention relates generally to digital signal space division switching systems and more particularly to an electronically controlled cross-connect system using a space division switching network to cross-connect digital signals may be synchronous or asynchronous to one another.

In a geographically dispersed transmission network consisting of "nodes" interconnected by node-to-node transmission facilities, a typical node will include a number of transmission terminals which send and receive signals from transmission terminals at other nodes, and an intra-node cross-connect system which routes signals between the transmission terminals at that node. A rudimentary cross-connect system is simply an array of jacks providing signal access to transmission terminals and patch cords providing jack-to-jack connections. The rudimentary cross-connect system can be reconfigured by manually rearranging the patch cords. However, the rudimentary cross-connect system is functionally and administratively inadequate for large modern networks with high traffic volume and frequent requirements for circuit re-routing. Such networks require large cross-connect systems which can be reconfigured electronically from a local control terminal or remotely from a network control master station. An electronic cross-connect system is a switch network which provides electronically switchable paths between its inputs and outputs.

For administrative reasons, the signals connected to the cross-connect system are all of the same type. In particular, for a digital cross-connect system the signals are all digital and all at the same nominal bit-rate, although not necessarily synchronous with one another.

Digital signals can be switched by time division methods, or space division methods, or a combination of both. Time division methods use multiplexing of low-bit-rate space-divided signals into higher-bit-rate time-divided signals, followed by time slot interchanges, followed by demultiplexing to lower-bit-rate space-divided signals. If the space divided signals to be switched are already at high bit-rates, it may be impractical to multiplex them to higher rates for switching purposes, but high-bit-rate signals can be switched by space division methods. This invention relates to space division switching networks for high-bit-rate digital signals, but the principles of the invention are also applicable to low-bit-rate digital signals.

The theory of space division switch networks was developed in terms of electro-mechanical switching machines for low frequency analog signals, wherein metallic crosspoints make or break metallic paths through the network. Such networks are inherently capable of transmission in either direction without signal conditioning, even in very large networks. Such networks are inappropriate for high-bit-rate digital signals.

High-bit-rate digital signals are more appropriately switched in networks of "large scale integrated" semiconductor devices wherein logic gates provide the crosspoint function. Such networks are inherently capable of transmission in one direction only, and the digital signals may require regeneration (i.e., reshaping and retiming) as they traverse the network.

A well-known class of high capacity space division switching network is the multistage co-ordinate switching network described by C. Clos in "A Study of Non-Blocking Switching Networks," Bell System Technical Journal, March 1953. A Clos network is non-blocking in the sense that a new path can always be connected from any input to any output without changing any of the already-connected internal paths in the network. Alternatively, a non-blocking "rearrangeable" network is one in which a new path can always be connected from any input to any output, provided one is allowed to rearrange already-connected internal paths without changing their endpoints. The advantage of a rearrangeable network over a Clos network is a major reduction in total number of crosspoints. The disadvantage is that, when a new connection is made, the rearrangement of internal paths may disturb existing through traffic. An object of the present invention is to provide a rearrangeable switching network for high-bit-rate digital signals in which existing through traffic is not disturbed when a new connection is made.

A high-bit-rate digital signal propagating through a large space division switch may be seriously degraded as it passes through a succession of crosspoints (logic gates) along its path. For reliable transmission through the switch network, every through signal may require regeneration (reshaping and retiming) at one or more stages within the switch network. Digital signal regeneration requires a clock waveform for retiming. If the through signals are all synchronous and bit-aligned to a common clock, then this one clock can be used for all regenerators within the switch network. However, if the through signals are asynchronous, then each one requires its own clock for regeneration. Another object of the present invention is to provide a space division switch network with internal signal regeneration for high-bit-rate digital signals which requires only one clock frequency for internal regenerators regardless of whether the through signals are synchronous or asynchronous. This object is achieved by converting asynchronous digital through signals to bit streams which are synchronous within the switch network.

SUMMARY OF THE INVENTION

Briefly, the present invention is a digital signal cross-connect system comprising a switched network having N input terminals and M output terminals where the switched network provides internal signal paths, each path connecting one input terminal to any one or more of the output terminals. The system further includes means for rearranging the internal paths without changing their end points and without disturbing the digital signals received at the output terminals of the rearranged paths.

In a preferred embodiment of the present invention, the M output terminals are equal in number to the N input terminals, or where M=N.

In another embodiment of the present invention, the system includes means for regenerating the digital signals flowing over the internal paths.

Another aspect of the present invention provides for either synchronous or asynchronous traffic signals through the digital signal cross-connect system.

Other objects, advantages and features of the present invention will become apparent from the following detailed description when taken in connection with the accompanying drawings.

BRIEF DESCRIPTION OF THE DRAWINGS

FIG, 2 shows the configuration of a 3-stage non-blocking Clos network for N=1024.

DETAILED DESCRIPTION OF THE DRAWINGS

The high bit-rate digital signals applied to digital cross-connect systems generally occur in pairs, a "go" signal and a "return" signal, together constituting one two-way digital communication channel. A cross-connect system connection N/2 two-way channels to another N/2 two-way channels can be constructed as two one-way switches, each with N/2 inputs and N/2 outputs. Alternatively, the cross-connect can be constructed as one-way switch with N inputs and N outputs. The second arrangement is more flexible in application because it can switch any input to any output, whereas the first arrangement cannot. For example, the single N×N switch can "loopback" a two-way channel by connecting the incoming path to the outgoing path. The double (N/2)×(N/2) switch cannot, because the incoming and outgoing paths are on separate switches. For this and other reasons, the single N×N switch is preferred, even though it requires more crosspoints. Its input and outputs may be paired to form a total of N two-way ports.

Figure 1:
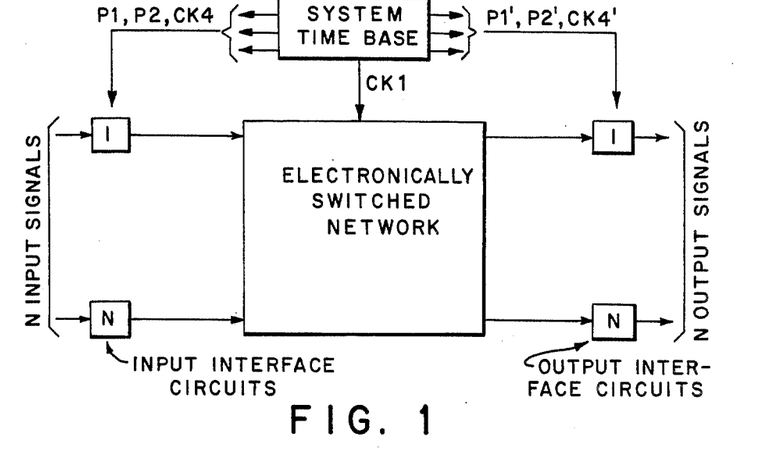
FIG. 1 is a block diagram of a digital electronic cross-connect system.

FIG. 1 is a block diagram of a digital electronic cross-connect system. The switched network is a one-way space-division non-blocking N×N switch which connects any of N inputs to any of N outputs. The system time base provides various timing waveforms to the network and the interface circuits. The network input and output signals are in some suitable switching format, such as unipolar NRZ (non-return to zero), all bit-aligned and bit-rate synchronous to a common system clock. The input signals to the input interface circuits and the output signals from the output interface circuits are in some suitable transmission format, such as B3ZS (bipolar, three zeros suppressed) for DS3 signals (level 3 of standard digital signal hierarchy), at some standard nominal bit rate, not necessarily synchronous with one another. The input and output interface circuits perform the required format and bit rate conversions.

A very similar conversion function is necessary and widely used in digital signal multiplexing-demultiplexing systems, wherein independent asynchronous input signals are format converted, brought to a common bit rate, and bit-aligned before being multiplexed (by bit interleaving) into a higher bit-rate signal of the digital signal hierarchy. The input and output interface circuits of FIG. 1 are very similar to interface circuits described elsewhere in connection with digital multiplexing-demultiplexing systems. There are, however, significant differences which will be discussed subsequently. We will first discuss the switch network.

Figure 2:
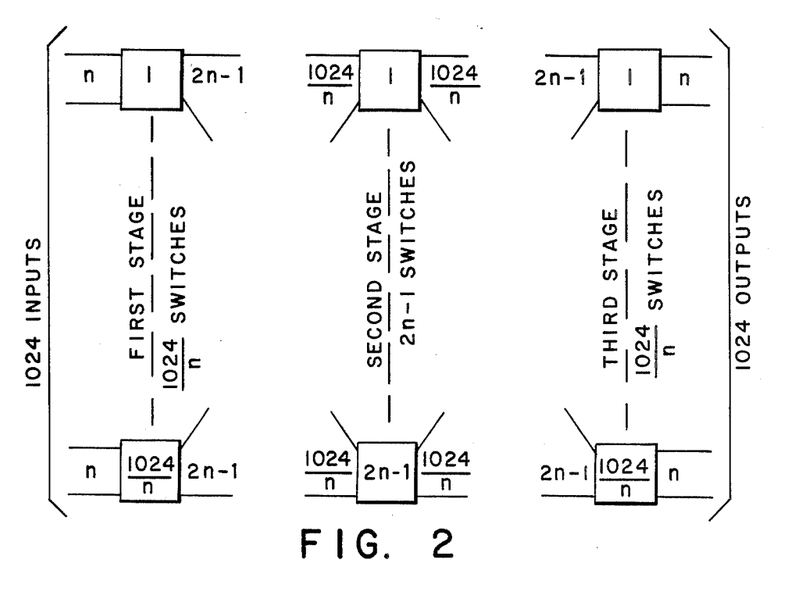
Figure 3:
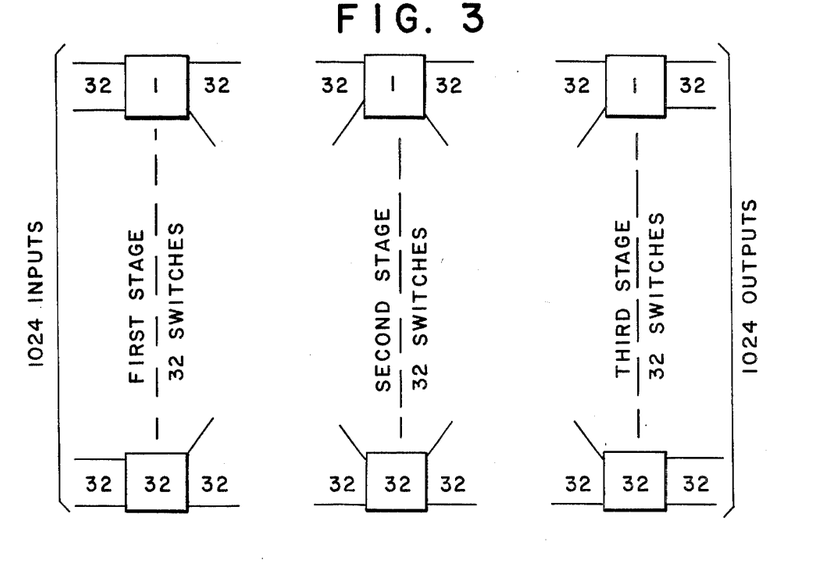
FIG. 3 shows the configuration of a 3-stage non-blocking rearrangeable network for N=1024, in which the switch units each stage are non-blocking networks with N=32.
Figure 4:
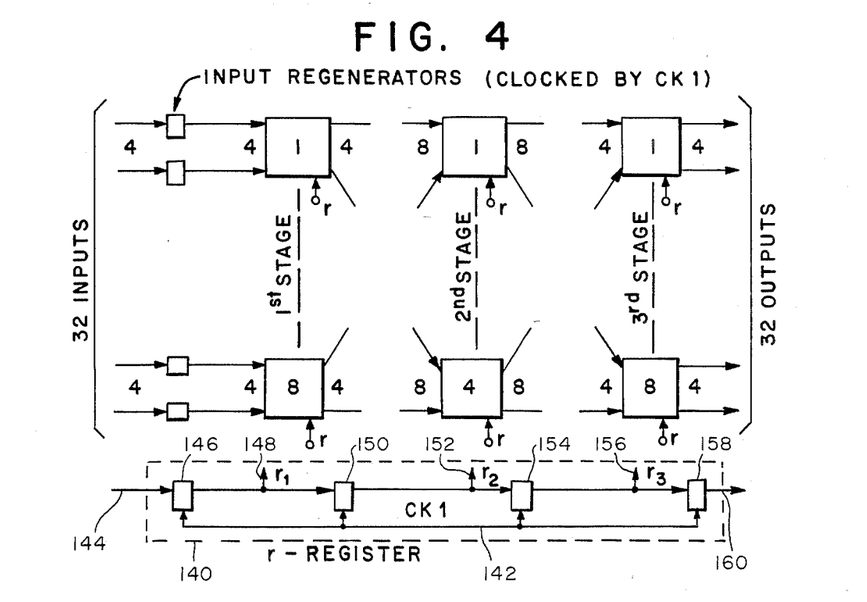
FIG. 4 shows the configuration of a 3-stage non-blocking rearrangeable network for N=32.

Consider a network of size N=1024. A single stage non-blocking network would require $N^2=1,048,576$ crosspoints. A 3-stage Clos network would have the configuration of FIG. 2 where the first stage consists of 1024/n switches, each with n inlets and $2n-1$ outlets, the second stage consists of $2n-1$ switches, each with 1024/n inlets and 1024/n outlets, and the third stage consists of 1024/n switches, each with $2n-1$ inlets and n outlets. The stage-to-stage connection pattern in FIGS. 2, 3 and 4 is this: output j of switch k is connected to input k of switch j. In FIG. 2, choosing n=8, 16, 32 or 64 yields total number of switches and total number of crosspoints as follows:

| Choice of n | Total Switches | Total Crosspoints |
| --- | --- | --- |
| 8 | 271 | 276,480 |
| 16 | 169 | 190,464 |
| 32 | 127 | 193,536 |
| 64 | 159 | 292,608 |

Probably n=32 would be the preferred choice.

Alternatively, a 3-stage rearrangeable network for N=1024 would have the configuration of FIG. 3 where each stage has 32 switches, each with 32 inlets and 32 outlets. The total number of switches is 96 and the total number of crosspoints is 96×32×32=98,304. Obviously, the rearrangeable network is preferred if it can be reconfigured without disturbing through traffic.

The crosspoint reduction can be carried further by replacing the smaller non-blocking switches of FIGS. 2 or 3 by 3-stage equivalents. In particular, the 32×32 switch for the rearrangeable network can be realized as a 3-stage rearrangeable network, as in FIG. 4, where the first and third stages each consist of eight 4×4 switches, and the second stage consists of four 8×8 switches, for a total of 512 crosspoints versus the 1024 crosspoints in a single stage 32×32 switch. This configuration has been chosen as an example because it is consistent with the current capabilities of semiconductor gate array technology. The 32×32 switch unit of FIG. 4 can be fabricated as one integrated circuit because it falls comfortably within the current practical limitations on total gates, package pins and power dissipation. The I.C. package includes other features described in the following.

The same 32×32 switch unit (I.C. package) can be used to construct switch networks of smaller and larger capacity than the network of FIG. 3. The first and third states each require one switch unit for every 32 inputs. If N is less than 1024, the second stage may have 32 switch units, as in FIG. 3. However, with a different stage-to-stage connection pattern, the number of switch units in the second stage can be reduced to the same as, or one greater than, the number in the first stage. For example, N=128 requires four 32×32 units in the first stage, four more in the third stage, and thirty-two 4×4 units in the second stage. But one 32×32 unit has the functional capability of eight 4×4 units (the eight 4×4 units are most easily visualized as 4×4 matrices lying along the diagonal of a 32×32 matrix). Therefore, the second stage can be constructed with four 32×32 units. Thus N=128 requires twelve units.

If N exceeds 1024, the secondary stage can be constructed of 3-stage networks of 32×32 units. For example, N=4096 requires 128 32×32 units in the first stage, 128 more in the third stage, and thirty-two 128×128 units in the second stage. Each 128×128 unit can be constructed from twelve 32×32 units as in the example above.

Figure 5:
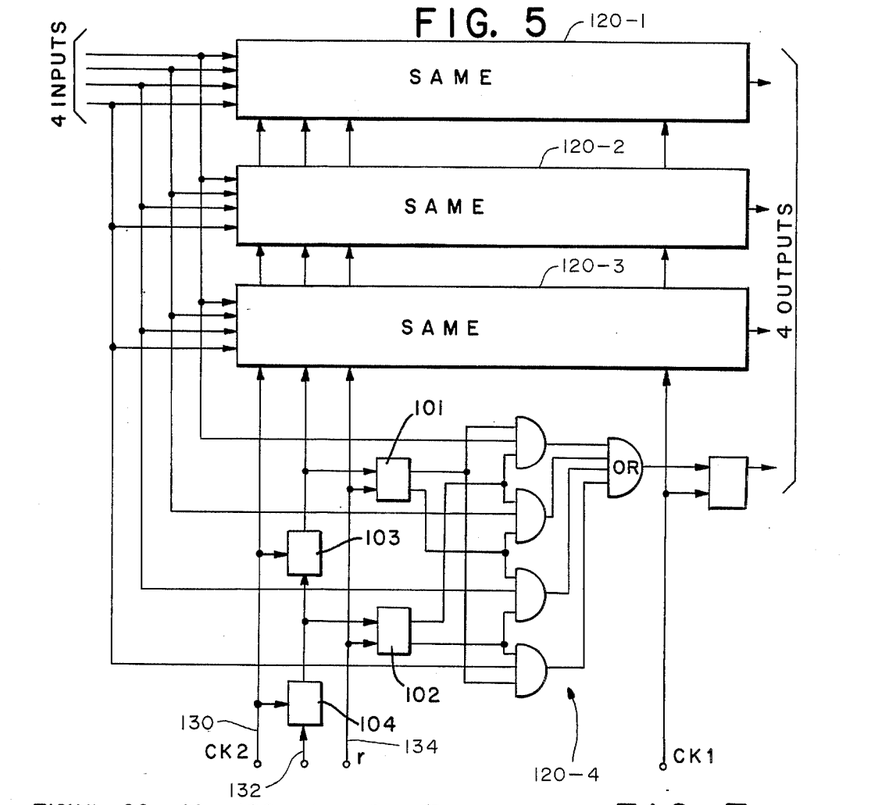
FIG. 5 shows the realization by logic circuit elements of a 4×4 non-blocking switch comprising part of the network of FIG. 4.

Each 4×4 switch in FIG. 4 can be realized as an array of logic elements as shown in FIG. 5. The arrangement of four 3-input AND gates and one 4-input OR gate and register cells 101 and 102 constitute a 1-of-4 selector with a 2-bit address register which connects one of four inputs to the output according to the 2-bit code stored in the address register. Four such selectors with their inputs connected in parallel can connect any input to any output (or any input to two or more outputs). That is, they provide a 4×4 non-blocking switch with an 8-bit address register which determines the crosspoint states.

Register cells 103 and 104 together with corresponding cells in the other three selectors constitute an 8-bit serial shift register, operated by clock CK2, for entering new configuration data into the switch unit. When the switch configuration is to be changed, clock waveform CK2 is activated to enter a new 8-bit code into the serial register. The new configuration is executed when, subsequently, a pulse applied to the r-terminal transfers the new code into the address register. Clock CK2 is completely independent of network clock CK1.

Each 8×8 switch in FIG. 4 can be realized as a paralleled array of eight 1-of-8 selectors, each with a 3-bit address register and a 3-bit serial register. The eight serial registers are connected in series to form one 24-bit serial register for entering new configuration data into the switch unit. Alternatively, the 8×8 switch could be realized as a 3-stage switch in which the first and third stages are each four 2×2 units and the second stage is two 4×4 units. This alternative does not save crosspoints but may be preferred for other reasons. It requires a 32-bit address register. In the following, we will assume a single stage 8×8 switch.

In FIG. 5, each output of the 4×4 switch passes through a register cell clocked by CK1, which is the network clock. These cells reshape and retime the through signals, i.e., they are internal regenerators. The 8×8 switch units of FIG. 4 have similar regenerators in each signal output. It is also desirable to regenerate each through signal after traversing external package-to-package connections. Therefore, the gate-array I.C. package includes a regenerator for every input signal. Thus, each through signal is regenerated four times within each 32×32 switch unit.

Each switch unit in FIG. 4 includes a serial shift register, clocked by CK2, as shown in FIG. 5, for entering new configuration data. All of these can be connected in series to form one serial shift register which, in this case, is 224 cells long. This is done to conserve pins on the gate-array I.C. package. The package should preferably have a serial register input pin and output pin for two reasons. Firstly, the output pin provides a means to clock the configuration code out of the package for checking, then back in. Secondly, it enables the user to connect the serial registers of different packages in series. This provides flexibility as to how new configuration codes are loaded into multipackage networks such as FIG. 3. If all serial registers in FIG. 3 are connected in series, the resulting serial register is 96×224=21,504 bits long.

The following is a description of how the network of FIG. 3 can be rearranged without disturbing any of the through traffic signals. In FIG. 4, the total number of address register cells in the twenty switch units is 224. Assume that a particular 224-bit code is currently stored in the address cells. This code determines the condition of every crosspoint in every switch unit of FIG. 4, i.e., the internal path configuration of the 32×32 switch.

Assume that the 32×32 switch is to be reconfigured to a new set of internal paths. Let the 224-bit code defining the new configuration be entered into the serial registers clocked by CK2. Entering the new code does not disturb existing traffic because the old code in the address cells is not yet changed.

A "tick" is a positive-going transition (rising edge) of a clock waveform. It causes the output of a clocked register cell to conform to its input. The cell holds that output until the next tick. Let t1, t2, t3 be successive ticks of network clock CK1. Let r1 be a single tick applied to the r-terminals of all first stage switch units; let r2 be a single tick applied to the r-terminals of all second stage switch units; let r3 be a single tick applied to the r-terminals of all third stage switch units, and let r1, r2, r3 coincide with t1, t2, t3, respectively.

The foregoing sequence of r-ticks can be conveniently generated by propagating a pulse (r-pulse) through the serial shift register (r-register), clocked by CK1, shown at the bottom of FIG. 4. The register has four cells corresponding to the four stages of regeneration in the signal paths. The r-pulse steps along r-register cells in time coincidence with signal bits stepping through the signal regenerators. The first cell of the r-register corresponds to the signal input regenerators, the others correspond to switch stage output regenerators.

Figure 7:
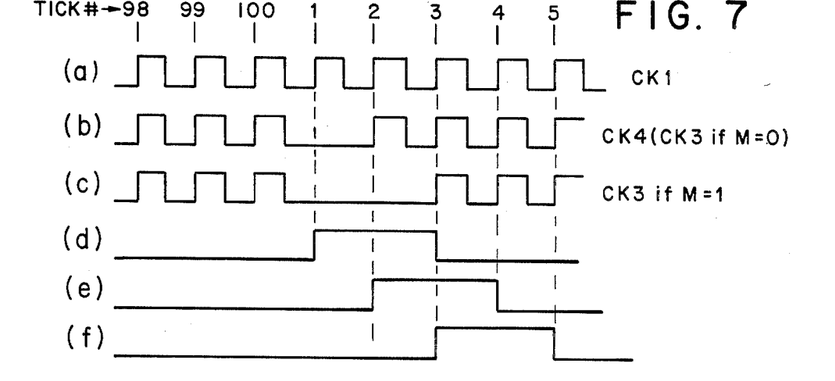
FIG. 7 shows six clock waveforms for describing the operation of the system.

FIG. 7a shows the waveform of network clock CK1. The clock ticks are the rising edges of CK1. FIGS. 7d, 7e and 7f show the r-pulse as it appears at successive stages of the r-register. The r-ticks are the rising edge of the pulse. The length of the pulse is immaterial, because its falling edge does not initiate any circuit actions.

Let the signal bits at the 32 inputs of the first stage switches of FIG. 4 be a1, a2, . . . a32 before t1 and b1, b2, . . . b32 after t1. Then before t1 the bits at the inputs of the regenerators of the first stage switches are a-bits in a pattern determined by the 64 (old) code bits in the first stage address registers. After t1, these a-bits appear at the inputs of the second stage switches, and the b-bits appear at the inputs of the first stage switches. But r1 coincides with t1. r1 loads new code bits into the first stage address registers. Therefore, after t1 the bits at the inputs of the regenerators of the first stage switches are b-bits in a pattern determined by the 64 new code bits in the first stage address register. Before t2, the bits at the inputs of the regenerators of the second stage switches are a-bits in a pattern determined by the 96 (old) code bits in the second stage address register. After t2, these a-bits appear at the inputs of the third stage switches, and the b-bits appear at the inputs of the second stage switches. But r2 coincides with t2, and r2 leads new code bits into the second stage address registers. Therefore, after t2, the bits as the inputs of the regenerators of the second stage switches are b-bits in a pattern determined by the 96 new code bits in the second stage address register. Before t3, the bits at the inputs of the regenerators of the third stage switches are a-bits in a pattern determined by the 64 (old) code bits in the third stage address register. After t3 these a-bits appear at the outputs of the regenerators of the third stage switches, and the b-bits appear at the inputs of the third stage switches. But r3 coincides with t3. r3 leads new code bits into the third stage address registers. Therefore, after t3 the bits at the input of the regenerators of the third stage switches are b-bits in a pattern determined by the 64 new code bits in the third stage address register. It can hence be seen how the process continues with subsequent cycles.

From the foregoing, it is evident that the a-bits are following a path determined solely by the old code bits in the address registers, while the b-bits are following a path determined solely by the new code bits in the new address registers. This desirable result is achieved by changing all the address bits in the same stage simultaneously, and making successive stage-by-stage changes on successive ticks of network clock CK1.

Obviously, this process can be continued over any reasonable number of stages. For example, FIG. 3 is a 3-stage network of 3-stage networks, i.e., a 9-stage network, which can be reconfigured in a nine-step sequence as described above. In this case, the r-register outputs of first stage switch units are connected to r-register inputs of second stage switch units and the r-register outputs of second stage switch units are connected to r-register inputs of third stage switch units. These connections yield a 12-stage shift register which generates three sets of three r-ticks with a one-tick delay between sets. The three one-tick delays accommodate the input regenerators in the 32×32 switches.

Finally, suppose that the old and new address codes define the same association between network inputs and outputs (same I-O map) but the internal paths are completely different. If the reconfiguration of paths is programmed as above, then at any output, bit bj follows bit aj just as it would if there was no reconfiguration. Therefore, the internal paths of the network can be rearranged without disturbing the through traffic on existing connections.

In the networks of FIGS. 3 or 4, any input may be connected to one or more outputs. For trouble shooting or administrative purposes, it may be necessary to reserve one or more output terminals to function as bridging connections to signals appearing on other normally-assigned outputs.

However, this reduces the capacity of the switch. Alternatively, it may be preferable to provide each 32×32 switch package with a 33rd output terminal plus internal circuitry to bridge the 33rd terminal onto any other output. The internal circuitry is a 1-of-32 selector which can be realized in several ways; e.g., eight 1-of-24 selectors (with the same 2-bit address) followed by one 1-of-8 selector (with 3-bit address), the combination requiring five address register cells to select the desired signal output. The bridging address register and its clock should preferably be completely separate from the serial register and clock (CK2) used for loading switch configuration codes. The bridging address input and clock require two more pins on the I.C. package.

In the foregoing discussion of the switch network, it was assumed that the switch network input signals were in NRZ format, all bit-aligned and all bit-rate synchronous to a common network clock CK1. The signal inputs to the input interface circuits will generally be in transmission format, not bit-aligned, and probably not synchronous. The input interface circuits provide the necessary conversion in signal characteristics. They are similar to interface circuits described elsewhere in connection with digital signal multiplexer-demultiplexer systems.

Figure 6:
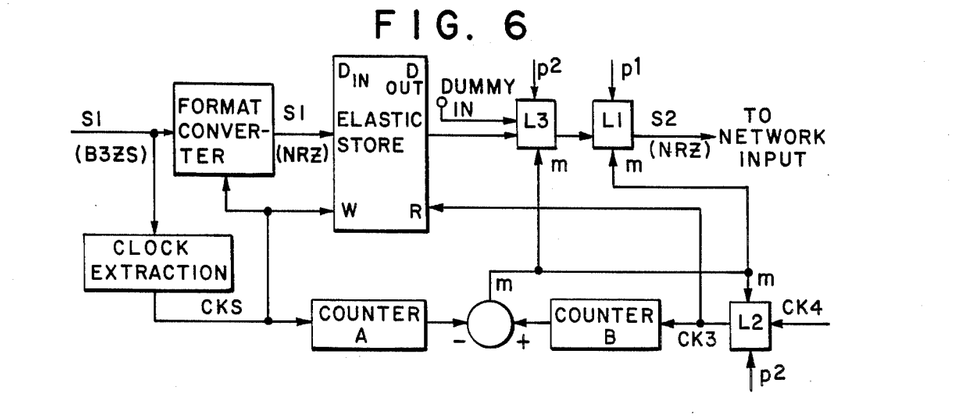
FIG. 6 shows principal elements of the input interface circuit which appears in FIG. 1.

FIG. 6 shows essential elements of the input interface circuit. The input signal S1 will be in a format which carries "embedded clock," such as B3ZS for DS3 signals. The clock extraction circuit derives a continuous clock waveform CKS from the input signal. CKS is used for regenerating S1, for timing the format conversion of S1 from B3ZS to NRZ, and for writing S1 bits (data bits) into a small FIFO (first in, first out) memory commonly known as an "elastic store" or "timing buffer." The data bits are read out of the memory by a different clock, CK3, which is derived from the network clock CK1 which operates the internal regenerators within the switch network, as already described above.

If the many input signals are all synchronous to a common bit rate, then the memory output is connected directly to the switch network input, and clock CK1 is used to clock bits out of the elastic store. In this case, the elastic store serves only to absorb differential input jitter and provide bit alignment at the network input.

More generally, however, the many input signals are asynchronous. They are individually brought to a common bit rate by a process commonly known as "bit-stuffing." In this case, network clock CK1 is slightly greater (typically less than 1% greater) than the nominal bit rate of the input signals.

For a simple numerical example, assume that CK1 provides repetitive frames of 100 time slots, that slots #3 through #100 are occupied by 98 data bits from the input signal, that slot bit #1 contains a marker bit (m-bit), and slot #2 contains a "maybe" bit which is a data bit if m=0 or a dummy bit (i.e., not data) if m=1. Then the number of data bits in 100 time slots is either 98 (if m=1) or 99 (if m=0). Each frame may contain 98 or 99 data bits, so over many frames the average number of data bits per frame can be any number between 98 and 99. That is, if any input signal bit rate lies between 98% and 99% of the network clock rate (CK1), that input signal can be re-written as a "stuffed" bit stream (S2 in FIG. 6) at CK1 rate. The stuffed bit stream contains all of the bits from S1 plus overhead in the form of m-bits (one per frame) and dummy bits (none or one per frame) at known locations in tee frame. A subsequent "destuffing" operation will remove the overhead bits and re-write the data bits onto a bit stream at the clock rate of the original input signal.

The foregoing sample is illustrative only. Many variations are possible. In bit-stuffing multiplexer applications, it is customary to provide redundant m-bits so that the marker value can be error protected. Note that the stuffed bit stream does not include a framing code to locate the marker bits. There is no need for the marker bits and maybe bits to be adjacent to one another.

The mechanics of bit stuffing are indicated in FIGS. 6 and 7. The network clock CK1 provides 100 "ticks" per frame (FIG. 7a). CK4 is the same clock with every tick #1 removed (FIG. 7b). CK3 is derived from CK4 by sometimes removing tick #2. p1 and p2 are timing pulses which occur once per frame, coincident with ticks #1 and #2. CKS clocks data bits (from S1) into the elastic store and drives counter B. Counts A and B are compared. If count B exceeds count A, logic L2, timed by p2, removes tick #2 from CK3 (FIG. 7c), which retards count B relative to count A. This process forces count B to follow count A. Therefore, CK3 and CKS have the same average number of ticks and data bits are clocked out of the elastic store by CK3 at the same average rate they are clocked in by CKS. The store does not overflow or underflow. No data is lost.

In FIG. 6, the elastic store provides new data on ticks #3 and through #100. It provides no data on tick #1. Logic L1, timed by p1, inserts an m-bit into S2 in time slot #1. The value of the m-bit depends on the current comparison of counts A and B. If m=0, the elastic store provides data on tick #2. If M=1, the elastic store provides no data on tick #2. Therefore, without optional logic L2, the bit (dummy) in time slot #2 of S2 is simply a repetition of the preceding data bit. Optional logic L2, conditioned by m=1 and timed by p2, provides the possibility of independently coding the dummy bits.

The operations described above are performed independently in every input interface circuit. All input interface circuits use the same p1, p2 and CK4 generated in the system time base. Each input interface circuit generates its own CK3, which depends on CKS. The inputs to the switched network are the independently stuffed bit streams, all synchronized to network clock CK1.

The operation of the switched network as been described above. The outputs of the switched network are the independently stuffed bit streams rearranged according to the network I-O map, and all equally delayed by an integral number of time slots equal to the number of regenerators in a switch path.

Figure 8:
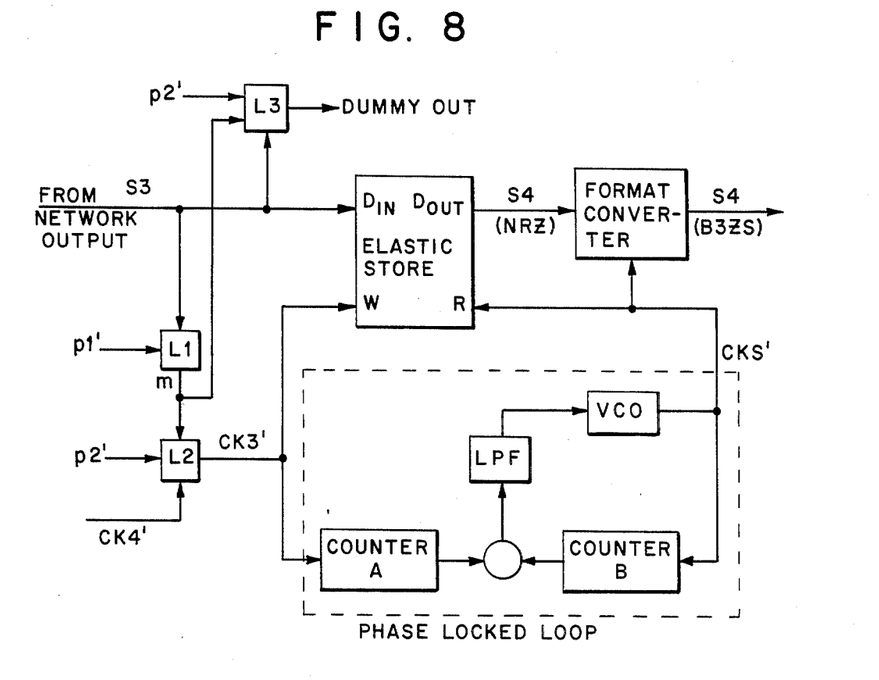
FIG. 8 shows principal elements of the output interface circuit which appears in FIG. 1.

FIG. 8 shows the principal elements of the output interface circuit, wherein the switch network output signal S3 is "destuffed" and reformatted as signal S4, for ongoing transmission. Let the transit time through the switch be d time slots. Then S3 is a replica of S2, delayed by d time slots. p1, p2 and CK4 are replicas of p1, p2 and CK4 (of FIG. 6) delayed by d time slots. All output interface circuits use the same p1', p2' and CK4' generated in the system time base.

p1' and the missing ticks of CK4' coincide with m-bits in S3. In FIG. 8, logic L1, timed by p1, registers the value of the m-bit. Logic L2, timed by p2', removes tick #2 from CK4' if, and only if, m=1. Therefore, CK3' is a replica of CK3 in FIG. 6, delayed by d time slots. CK3' is used as write clock for the elastic store in FIG. 8. The missing ticks of CK3' coincide with the m-bits and the dummy bits in S3. Therefore, these bits are not written. Only the data bits in S3 are clocked into the store. Optional logic L3, conditioned by m=1 and timed by p2', registers the value of the dummy bit.

CK3' is also used as input to a phase locked loop which generates clock waveform CKS' which clocks data out of the elastic store. The phase locked loop is a conventional configuration of voltage controlled oscillator (VCO), two counters, a difference circuit, and a low pass filter (LPF). CKS' has the same number of ticks as CK3', but they are uniformly distributed in time—except for a small amount of low frequency jitter which is an inevitable consequence of the stuff/destuff processing. CKS' has precisely the same average bit rate as CKS, but CKS' is not a delayed version replica of CKS. In particular, the stuff/destuff process will absorb high frequency jitter components of S1 and not reproduce them in S4.

Data bits are clocked out of the elastic store by CKS' at the same average rate they are clocked in by CK3'. The store does not overflow or underflow. No data is lost. Therefore, the bits in output signal S4 are identical to the bits in input signal S1 of FIG. 6. CKS' also clocks the format conversion logic which coverts the destuffed NRZ signal to B3ZS format. The operations described above are performed individually in every output interface circuit.

FIGS. 6 and 8 include optional logic whereby the dummy bits of the stuffed bit stream can be independently coded at the input interface circuit and extracted at the output interface circuit. This is certainly not necessary but may be advantageous for administrative reasons. The dummy bits constitute an independent service channel within each stuffed bit stream. Of course, the bit rate of the dummy channel depends on the bit rate of the input signal S1. Nevertheless, the dummy channels are useful for various administrative or maintenance or monitoring purposes. For example, if dummies are coded in a unique pattern (e.g., alternating) at the input, then pattern violations detected at the output indicate errors in transit along that switch path. In-service path tracing could be accomplished by uniquely coding (e.g., all 1's) the dummies at one input and detecting which output receives the unique code.

In the previous discussion of the switched network there is a detailed description of how the internal paths of the network can be rearranged without disturbing through traffic. If the signals within the switch network are stuffed bit streams they consist of through traffic plus overhead. It then becomes possible to rearrange network paths without disturbing through traffic, even though the rearrangement process mutilates one or more consecutive (overhead) bits in transit. This possibility extends the range of applications of rearrangeable networks to cases where rearrangements may, in fact, cause bit errors. The method of accommodating this switch limitation is as follows:

(1) Constrain the switch control procedure such that any rearrangement, when it occurs, must coincide with an m-bit.
(2) When a rearrangement occurs, force L2 of all input interface circuits (FIG. 6) to remove tick #2 from CK3.
(3) Likewise, force L2 of every output interface circuit (FIG. 8) to remove corresponding tick #2 from CK3'.

Thus, every stuffed bit stream has had a dummy bit inserted and removed, but the process has not relied on the value of the coincident m-bit. It makes no difference whether the m-bit was 0 or 1. Therefore, the m-bit can be mutilated within the switch. Furthermore, if m-bits and dummies are contiguous, two consecutive bits can be mutilated without disturbing data bits (through traffic). This procedure could conceivably require a miniscule increase in CK1 clock rate to accommodate the extra dummies created by switch rearrangements. In extreme cases, one could design the switch control system to use multi-bit m-words and thereby allow rearrangements to mutilate several consecutive bits.

Figure 5A:
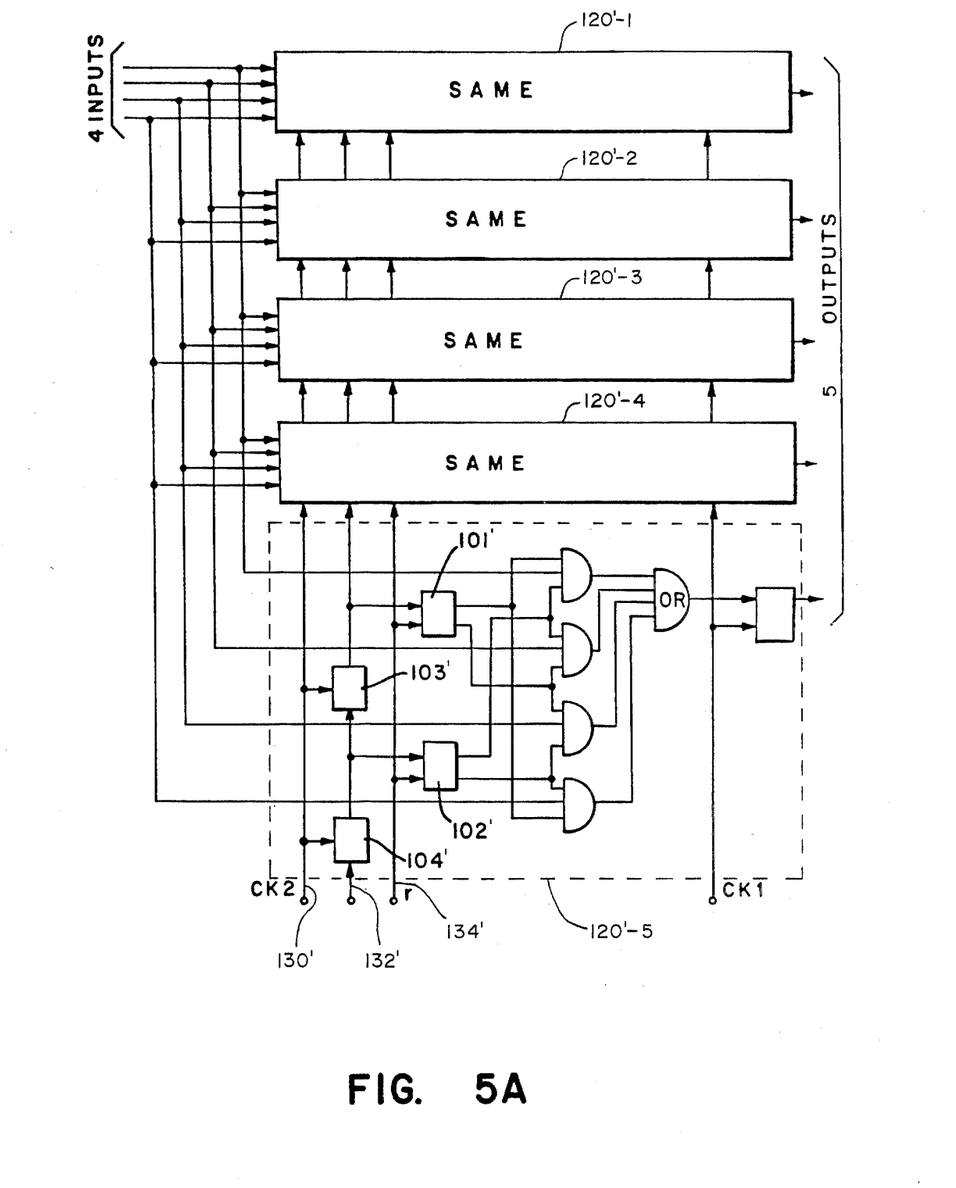
FIG. 5A shows the realization by logic circuit elements of a 4×5 (N×M) non-blocking switch according to the present invention.

The present invention has been described to illustrate one preferred embodiment of an improved digital cross-connect system where the number of inputs is equal to the number of outputs (N inputs and N outputs). However, other embodiments of the present invention are possible, where the number of inputs is not necessarily equal to the number of outputs (e.g., N inputs and M outputs, where N is not necessarily equal to M). For example, the addition of a fifth logic block to FIG. 5 provides a switch with four inputs and five outputs in which any output can be connected to any input. FIG. 5A depicts the realization by logic circuit elements of a 4×5 (N×M) non-blocking switch which could be utilized with the present invention. Therefore, it is intended that the scope of the present invention be defined by the following claims.

What is claimed is:

1. A digital signal switching system comprising
    a multi-stage space-division switched network having N input terminals and M output terminals, said switched network providing a plurality of internal digital signal transmission paths where each stage includes a certain number of switches for normally switching said digital signals between each input and one or more outputs in each stage, each of said internal signal paths connecting one of said input terminals to any one or more of said output terminals through each stage only through said certain number of switches, and
    means for simultaneously rearranging in a non-blocking fashion any number of said internal signal paths for each stage of said network where said digital signals are switched only through said certain number of switches without changing their end points and without disturbing the digital signals received at the output terminals of said rearranged paths.

2. The system as in claim wherein M is equal to N.

3. The system as in claim 1 including means for regenerating said digital signals flowing over said internal signal paths.

4. A system as in claim 1 wherein said digital signals are synchronous.

5. A system as in claim 1 wherein said digital signals are asynchronous.

6. A system as in claim 1 wherein each of said switches includes selector means associated with each output terminal for establishing a signal path to that output from a selected input, each selector means including first register means for storing a configuration code representing the current address of each of the selected inputs.

7. A system as in claim 6 wherein each of said selector means also includes second register means for entering and storing new configuration codes which will subsequently be transferred to said first register means.

8. A system as in claim 7 including means for sequencing the transfer of said new configuration codes from said second register means into said first register means, whereby a change in the network configuration is accomplished by sequentially changing the configuration of each switching stage in time synchronism with the progress of a digital signal bit through the switching stages.

9. In a multi-stage space division digital signal switching system having N input terminals and M output terminals with internal digital signal paths through said switched network where each stage includes a certain number of switches for normally switching said digital signals between each input and one or more outputs in each stage, and where each of said paths connects any one of the input terminals to any one or more of the output terminals only through said certain number of switches, the method comprising the steps of simultaneously rearranging in a non-blocking fashion any number of said internal signal paths for each stage of said network only through said certain number of switches without changing the end points and without disturbing the digital signals received at tho output terminals of the rearranged paths.

10. The method as in claim 9 including the step of regenerating the digital signals flowing over the internal paths.

11. A digital signal switching system operating at a certain network clock rate having successive clock ticks, said system comprising
    a multi-stage space-division switched network having N input terminals and M output terminals where each stage has address bits which can be changed on a single clock tick, said switched network providing a plurality of internal digital signal transmission paths, each of said internal signal paths connecting one of said input terminals to any one or more of said output terminals, and
    means for simultaneously rearranging in a non-blocking fashion any number of said internal signal paths for each stage of said network without changing their end points and without disturbing the digital signals received at the output terminals of said rearranged paths, including means for changing the address bits in the same stage simultaneously, and means for making successive stage by stage address changes on successive ones of said network clock ticks.

12. A digital signal switching system comprising
    a multi-stage space-division switched network having N input terminals and M output terminals where each stage includes register means for holding address bits, said switched network providing a plurality of internal digital signal transmission paths, each of said internal signal paths
    connecting one of said input terminals to any one or more of said output terminals, and
    means for simultaneously rearranging in a non-blocking fashion any number of said internal signal paths for each stage of said network without changing their end points and without disturbing the digital signals received at the output terminals of said rearranged paths, including means for changing the address bits in the same stage simultaneously, and means for changing the address bits in successive stages in sequential synchronism with the passage of a signal bit through said network.

13. A multi-stage switching system for switching multi-bit digital signals, said system comprising
    a space-division switched network having N input terminals and M output terminals, said network providing a plurality of internal transmission paths for digital signals, each of said paths connecting one of said input terminals to any one or more of said output terminals,
    means for simultaneously rearranging in a non-blocking fashion said paths for each stage of said network without changing their respective end points, and
    means for executing the rearrangement of said paths such that at an output terminal of any such rearranged path the last bit of the digital signal arriving over the old path and the first bit of the digital signal arriving over the new path are equally-delayed adjacent bits of the digital signal applied to the input terminal of said rearranged path.

14. A multi-bit signal switching system comprising
a space-division switched network having N input terminals and M output terminals, said network providing a plurality of internal transmission paths for digital signals, each of said paths connected one of said input terminals to any one or more of said output terminals,
means for simultaneously rearranging in a non-blocking fashion any number of said paths without changing their respective end points for each stage of said network,
means for executing the rearrangement of said paths such that at an output terminal of any such rearranged path the last bit of the digital signal arriving over the old path and the firs bit of the digital signal arriving over the new path are equally delayed adjacent bits of the digital signal applied to the input terminal of that rearranged path whereby the rearrangement is accomplished without disturbing the digital signals flowing over such rearranged paths without requiring temporarily-assigned auxiliary paths to support such signals, and in a time interval no longer than the transit time of a digital signal through the network.

15. A system as in claim 14 wherein said multi-bit signals comprise stuffed bit streams including through traffic digital signals and locally generated overhead bits, and wherein said means for executing include means for executing the rearrangement of said paths without disturbing said digital signals even in one or more of said overhead bits are mutilated in transit.

16. The system as in claim 14 wherein M is equal to N.

17. The system as in claim 14 including means for regenerating said digital signals flowing over said internal signal paths.

18. A system as in claim 14 wherein said digital signals are synchronous.

19. A system as in claim 14 wherein said digital signals are asynchronous.

20. A system as in claim 14 wherein said network is a multi-stage network and wherein each stage includes a certain number of switches for normally switching said digital signals between each input and one or more outputs in each stage, and wherein each of said switches includes selector means associated with each output terminal for establishing a signal path to that output from a selected input, each selector means including first register means for storing a configuration code representing the current address of each of the selected inputs.

21. A system as in claim 20 wherein each of said selector means also includes second register means for entering and storing new configuration codes which will subsequently be transferred to said first register means.

22. A system as in claim 21 including means for sequencing the transfer of said new configuration codes from said second register means into said first register means, whereby a change in the network configuration is accomplished by sequentially changing the configuration of each switching stage in time synchronism with the progress of a digital signal bit through the switching stages.

* * * * *